METHODS AND APPARATUS FOR ALIGNING RESILIENT LEADS

Filed Oct. 23, 1965

4 Sheets-Sheet 1

INVENTOR
R.F. PASTUSZAK
BY J. J. Landis
ATTORNEY

Oct. 31, 1967 R. F. PASTUSZAK 3,349,813

METHODS AND APPARATUS FOR ALIGNING RESILIENT LEADS

Filed Oct. 23, 1965 4 Sheets-Sheet 2

METHODS AND APPARATUS FOR ALIGNING RESILIENT LEADS

Filed Oct. 23, 1965 4 Sheets-Sheet 3

United States Patent Office 3,349,813

Patented Oct. 31, 1967

3,349,813

METHODS AND APPARATUS FOR ALIGNING RESILIENT LEADS

Ronald F. Pastuszak, Allentown, Pa., assignor to Western Electric Company, Incorporated, New York, N.Y., a corporation of New York Filed Oct. 23, 1965, Ser. No. 504,022

7 Claims. (Cl. 140—147)

This invention relates generally to methods and apparatus for aligning a resilient lead perpendicular to an article in which one end of the lead is mounted. More particularly, the invention relates to methods and apparatus for aligning a plurality of leads fixed at one end to an article so that the leads are in parallelism with one another and perpendicular to the article. Accordingly, the general objects of the invention are to provide new and improved methods and apparatus of such character.

In the manufacture of certain electrical components having a plurality of resilient leads, it is necessary that the leads be aligned in parallelism with one another and perpendicular to the supporting structure, hereinafter called the platform, of the components. When the leads are made of a relatively fine wire, they may be aligned and straightened by using a combing device or in some cases the leads may be straightened and aligned by inserting the leads into a socket having an array of apertures corresponding to the desired configuration and alignment of the leads. In such case, the leads are straightened and aligned by the mere insertion into and withdrawal from the socket. However, with the advent of newer designs of electrical components, it has been found advantageous in some circumstances to place relatively rigid leads on the components. These leads are not satisfactorily aligned by the prior known techniques because of their tendency to "spring back" to their initial misaligned position. This is due to the higher elastic limit of the more rigid leads. It has been found necessary to stress the leads beyond their elastic limit to effect plastic deformation, but this must be done in a manner so as not to damage the connection between the leads and the platform to which the leads are attached.

Another object of this invention is to provide new and improved methods and apparatus for aligning relatively rigid leads which are supported at one end on a platform and alleviating the problem of spring back.

It is a further object of the invention to provide new methods and apparatus for aligning a plurality of leads without damaging the connection between the leads and the platform on which the leads are mounted.

With these and other objects in mind, a method in accordance with the invention includes holding stationary the platform on which the leads are mounted while moving the free ends of the leads in a generally outwardly expanding involute to stress all the leads beyond their elastic limit in the same direction and magnitude. Thereafter, the ends of the leads are moved in a generally inwardly contracting involute to return the leads to a position substantially perpendicular to the platform and in parallelism with one another.

An apparatus in accordance with the invention includes a socket having an array of apertures which conforms to the desired configuration of the leads. The free ends of the leads are placed in the apertures and the platform is held stationary in a nest. Facilities are provided for moving the socket in a generally outwardly expanding involute motion to stress equally all the leads beyond their elastic limit. Thereafter, the same facilities move the socket in a generally inwardly contracting involute so as to align the leads perpendicular to the platform and in parallelism with one another.

Other objects, advantages and aspects of the invention will become apparent by reference to the following detailed description and drawings of a specific embodiment thereof, wherein.

*Introduction*

Figures 1, 2:
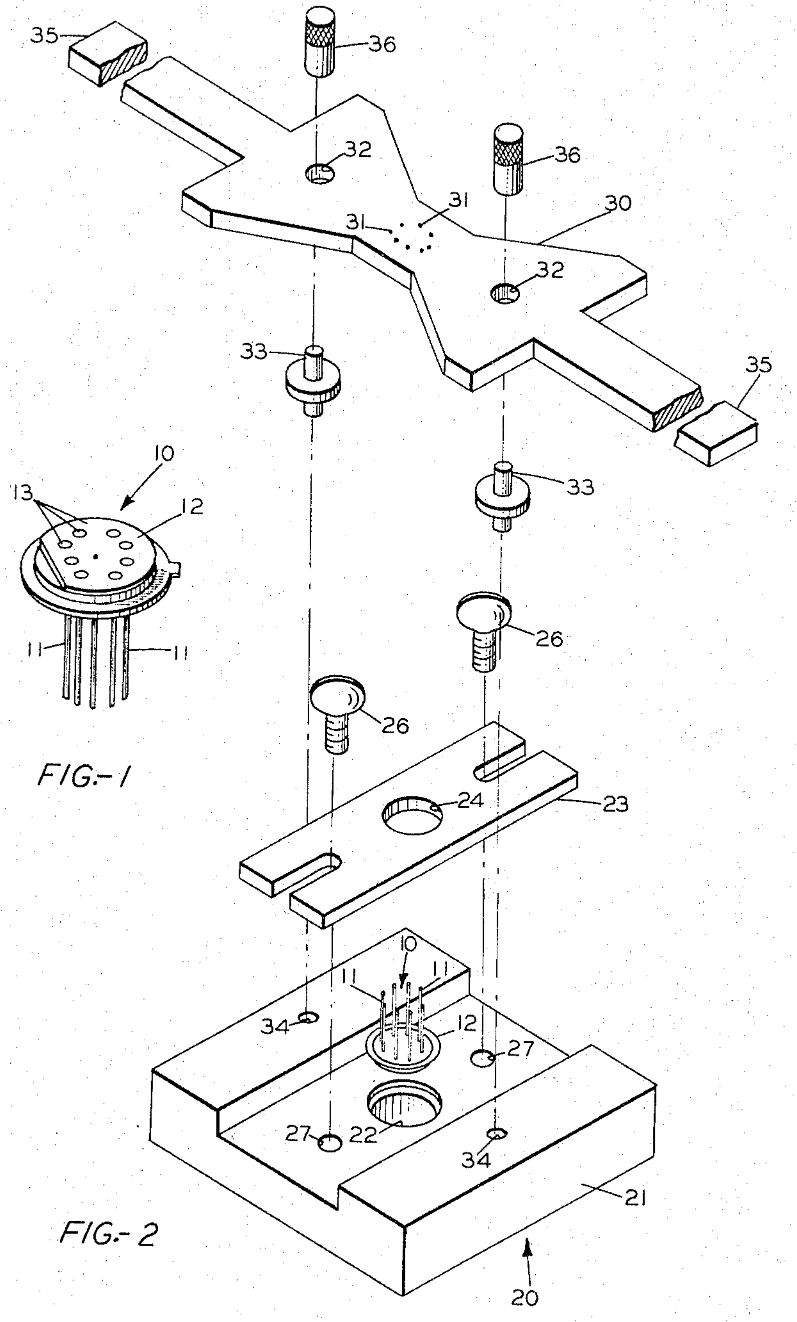
FIG. 1 is a perspective view of an electrical component, such as an integrated circuit, the leads of which may be aligned in accordance with the invention.
FIG. 2 is an exploded perspective view of a fixture for manually aligning the leads of the electrical component shown in FIG. 1.

In FIG. 1, there is shown an electrical component 10 having a plurality of leads 11—11 extending downwardly from a platform 12 to which the ends of the leads are connected. The leads 11—11 are made of a nickel alloy and are typical of the leads which may be straightened and aligned with the method and apparatus of the invention. In this example, the leads 11—11 are welded to respective studs 13—13 which are brazed to the top of the platform 12. In subsequent operations, semiconductor wafers (not shown) are mounted on the platform 12 and are connected by wires (not shown) to the studs 13—13 to provide electrical connection between the wafers and the leads 11—11.

*Manual method*

Figure 3:
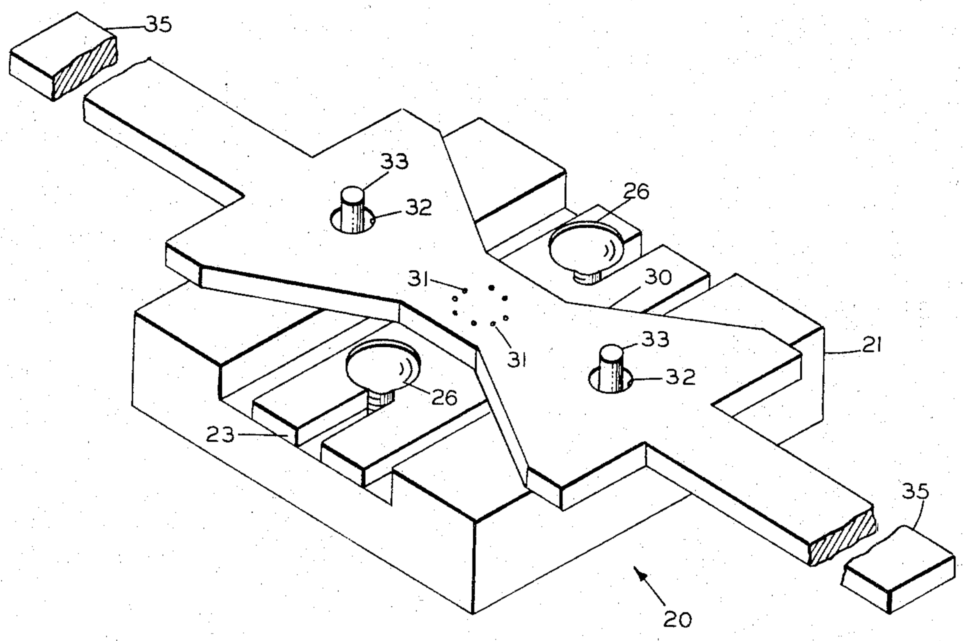
FIG. 3 is a perspective view of the fixture shown in FIG. 2 assembled.
Figure 4:
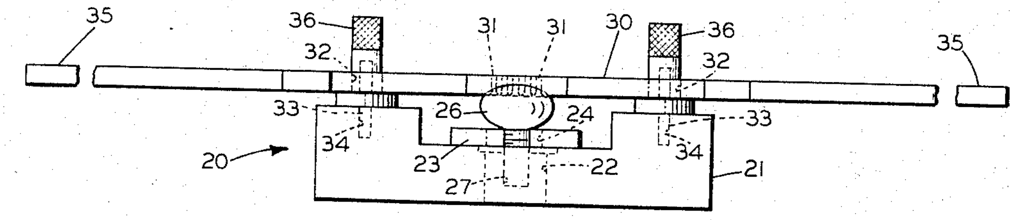
FIG. 4 is a front elevation view of the fixture shown in FIG. 3.

Referring to FIGS. 2–4, there is shown a fixture 20 with which the instant method of moving the ends of the leads 11—11 in an outwardly expanding involute and then an inwardly contracting involute is manually performed. The fixture 20 includes a base 21 having a cavity 22 for receiving the body of the component 10. A component retaining plate 23 is positioned over the base 21 so that an aperture 24 is aligned with the cavity 22. The plate 23 is secured to the base 21 by a pair of thumb screws 26—26 which are received in threaded holes 27—27 of the plate 23 to hold the component 10 in the cavity 22. With the component 10 so held, and the leads 11—11 extending upwardly, an aligning plate 30 having an array of apertures 31—31 is moved downwardly over the upwardly extending leads 11—11. The apertures 31—31 are precisely located on the plate 30 in the configuration which it is desired that the leads 11—11 assume. The aligning plate 30 has a pair of guide holes 32—32 which receive upstanding pins 33—33 which are mounted in holes 34—34 in the base 21. The lower ends of the pins 33—33 fit snugly into the precisely located holes 34—34; whereas the upper ends of the pins 33—33 are somewhat smaller than the diameter of the guide holes 32—32. This permits generally involute movement by an operator of the aligning plate 30 and the ends of the leads 11—11 positioned in the apertures 31—31. The bottoms of the apertures 31—31 are flared (FIG. 4) to allow easy insertion of the leads 11—11 therein.

Initially, when the aligning plate 30 is placed over the pins 33—33, the leads 11—11 are extending in disarray in various directions and with differing amounts of misalignment. The flare on the apertures 31—31 should be sufficiently large to enable all of the leads 11—11 to enter the apertures 31—31. The pins 33—33 are generally centered in the apertures 32—32 (FIG. 3) as the aligning plate 30 is inserted initially over the leads 11—11. The operator grips a pair of handles 35—35 in his hands and slowly moves the plate 30 with a generally outwardly expanding involute motion until the pins 33—33 are against the inner periphery of the holes 32—32. The holes 32—32, the pins 33—33 and the leads 11—11 are dimensioned such that when the pins 33—33 are against the periphery of the holes 32—32, the ends of the leads 11—11 are stressed beyond their elastic limit. Thus, plastic deformation of the leads occurs and the leads 11—11 do not return to their initial positions of disarray when the aligning plate 30 is later removed.

The operator continues to move the aligning plate 30 in a circular path maintaining the pins 33—33 against the inner periphery of the holes 32—32. This causes continuous bending and stressing of the leads beyond their elastic limit until such time as all the leads reach what may be termed a state of equilibrium, i.e., the leads are bent in substantially the same direction and magnitude and, if released at that time, would spring back to substantially the same position, but not necessarily to a position perpendicular to the platform 12. This overcomes the unequalness of the stresses in the leads and their misalignment with one another which was the condition at the commencement of the operation. It is believed that the more times the aligning plate 30 is rotated the more similar the stresses in the leads become. This provides more nearly equal spring back when the aligning plate 30 is subsequently removed.

Having achieved a state of equilibrium, the operator then moves the aligning plate 30 in a generally contracting involute until the pins 33—33 are substantially centered in the apertures 32—32. This movement plastically deforms the leads 11—11 and aligns them generally perpendicular to the platform and in parallelism with one another. The aligning operation is completed by inserting accurately machined tubular gages 36—36 into the holes 32—32 and over the top ends of the pins 33—33 (FIG. 4) to center the holes 32—32 and the aligning plate 30 with respect to the pins 33—33. This accurately aligns the apertures 31—31 and the ends of the leads 11—11 perpendicular to the platform 12 of the component 10. The pins 36—36 then are removed and the aligning plate 30 is raised vertically from the pins 33—33 and the fixture 20. Removal of the thumb screws 26—26 and the retaining plate 23 permits withdrawal of the component 10.

*Apparatus*

Figure 5:
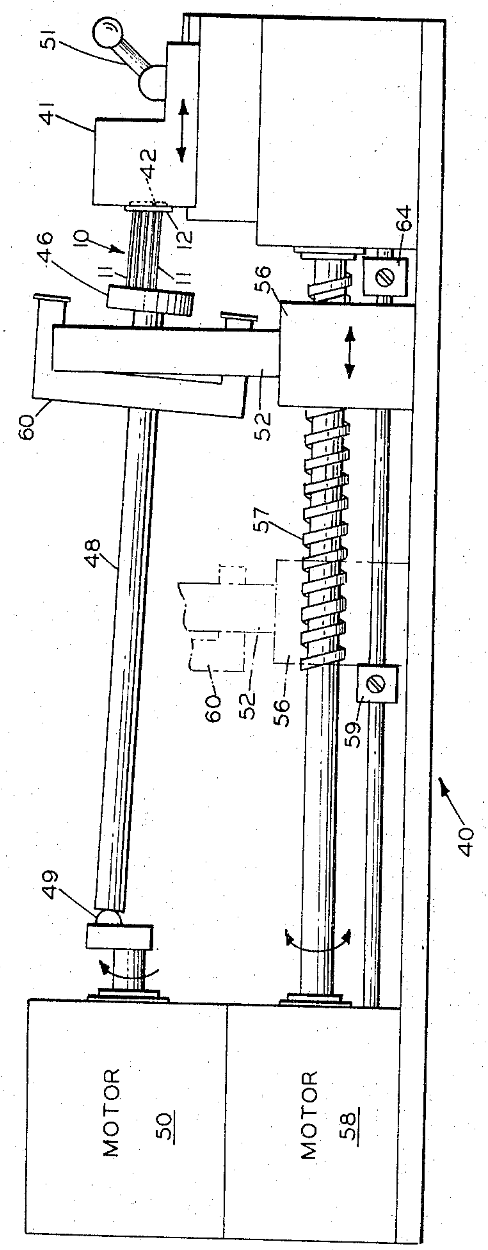
FIG. 5 is a side elevation view of a novel fixture for automatically aligning the leads of an electrical component in accordance with the method and apparatus of the invention.

In FIG. 5, there is shown a novel apparatus, designated generally 40, for providing the outwardly expanding and inwardly contracting involute motion to align the leads 11—11. The apparatus 40 comprises a carriage 41 having a recess 42 which receives and holds the body of the component 10 with a snug fit. An aligning plate 46 having an array of apertures 47—47 is provided for receiving the free ends of the leads 11—11. The plate 46 is secured to an end of a shaft 48. The other end of the shaft 48 is eccentrically mounted by a ball and socket 49 to the drive shaft of a motor 50. The carriage 41 is movable to the right (FIG. 5) to allow loading and unloading of the components. The carriage 41 is moved to the left to place the free ends of the leads 11—11 in the apertures 47—47 and then is clamped in that position by a locking mechanism 51.

Figures 6, 7:
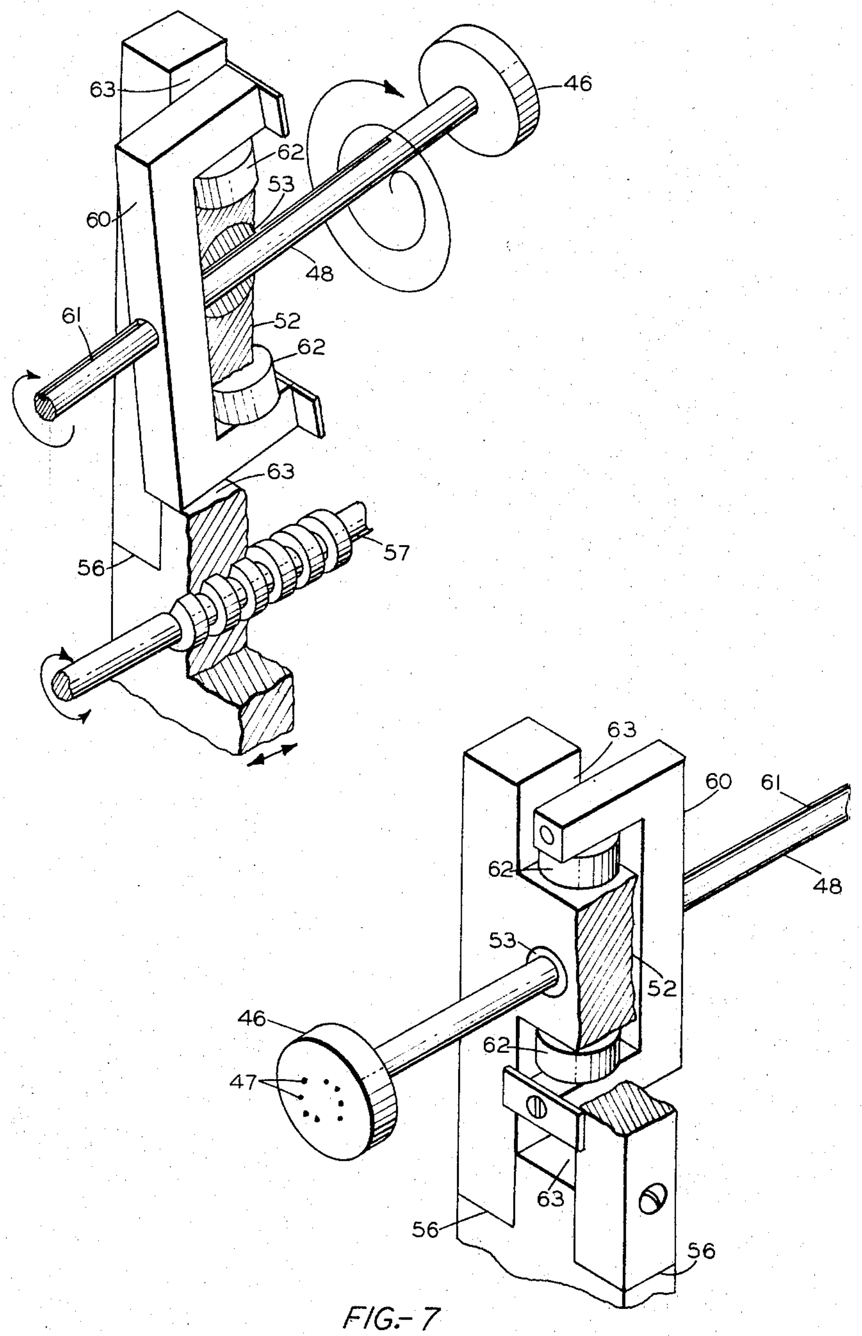
FIG. 6 is a perspective view with portions removed of a reciprocable fulcrum shown in FIG. 5 for providing the desired involute motion to the aligning fixture.
FIG. 7 is a perspective view with portions removed of the fulcrum and showing an aligning plate.

In order to move the plate 46 and the ends of the leads 11—11 in a generally expanding involute and subsequently in a contracting involute, the shaft 48 is mounted on a movable fulcrum 52 (FIGS. 5–7). The fulcrum has a spherical bearing 53 through which the shaft 48 extends. The bearing 53 permits the shaft 48 to rotate eccentrically without undue wear to the mating surfaces. The fulcrum 52 is mounted on an internally threaded slide 56 which is reciprocably mounted on a screw 57. With the fulcrum 52 in the position shown in solid lines (FIG. 5), the aligning plate 46 has a negligible amount of orbital movement. The slide 56 and the fulcrum 52 are moved to the left (toward the position shown in broken lines in FIG. 5) by the screw 57, which is driven by a reversible motor 58 through appropriate gearing (not shown). As this is happening, the aligning plate 46 moves in a generally expanding involute due to the eccentricity of the shaft 48 until the slide 56 strikes a stop 59.

While the aligning plate 46 is moving in an involute manner, it is desired that there be no rotation of the aligning plate 46 on its own horizontal axis as this will cause unnecessary twisting of the leads 11—11. In order to avoid this, a restraining collar 60 is keyed to a slot 61 in the shaft 48. (FIG. 6). The collar 60 has rollers 62—62 which ride in openings 63—63 on the fulcrum 52. The rollers slide in the openings 63—63, and also allow the collar 60 to pivot on the axis of the rollers. This allows the shaft 48 to follow freely its eccentric drive, but prevents the shaft 48, and thereby the aligning plate 46 from rotating on its own axis.

*Operation*

The carriage 41 is moved to the right (FIG. 5) and a component 10 is inserted into the recess 42. The carriage 41 is then moved to the left and clamped so that the free ends of the leads 11—11 are inserted in the apertures 47—47 of the aligning plate 46. At this time, the fulcrum 52 is positioned at the right (FIG. 5) so that the slide 56 abuts against a stop 64. In this position substantially no motion is applied to the plate 46 as a result of the eccentric rotation of the shaft 48. The motors 50 and 58 are then energized to rotate the shaft 48 and the screw 57, respectively, and to move the fulcrum 52 and the collar 60 slowly to the left (FIG. 5). This gradually increases the amount of rotational movement of the aligning plate 46 and moves the ends of the leads 11—11 in a generally expanding involute. As the fulcrum 52 continues to move to the left and the leads are deformed more and more, the elastic limit of the leads 11—11 is reached and actual plastic deformation occurs. As was previously described, the bending of the leads 11—11 acts to equalize the stresses on each of the leads to provide an equal amount of spring back in each lead. The rotation of the screw 57 is terminated when the slide 56 strikes the stop 59 by a conventional limit switch (not shown). The shaft 48 continues to rotate to continue the bending of the leads 11—11 beyond their elastic limit. After several such revolutions, during which the stresses on the leads reach a state of equilibrium, the fulcrum 52 is gradually returned to the right (FIG. 5) by the reversal of the motor 58. This gradually reduces the amount of bending on the free ends of the leads 11—11, moving them in a generally contracting involute manner. When the slide 56 strikes the stop 64, the motors 50 and 58 are stopped, and the apertures 47—47 of the aligning plate 46 are substantially horizontal. Thus, the leads 11—11 are perpendicular to the platform 12 and are in parallelism with one another. The carriage 41 is then moved to the right (FIG. 5) withdrawing the ends of the leads 11—11 from the apertures 47—47 after which the component 10 is removed from the recess 42.

*Examples*

In a particular example, the component 10 (FIG. 1) had leads 11—11 made of a metal sold under the trademark of "K-monel" and the leads were approximately 15/32" long and 0.025" square in cross section. It was necessary that the ends of all the leads be aligned so that none of the ends were more than 0.004" out of axial alignment. It was found that plastic deformation of the leads began when the leads were deflected approximately 0.020" from their initial position. The fixture 20 (FIGS. 2-4) was designed so that the pins 33—33 had a diameter of 0.125″ and the guide holes 32—32 had an inside diameter 0.199″. This provided a maximum eccentricity of 0.037″ when the pins 33—33 were against the inside periphery of the guide holes 32—32. In this manner the ends of the leads 11—11 were deflected in a maximum of 0.037″ from their desired aligned position during the outermost portion of the involute motion.

The aligning plate was then returned in a generally contracting involute until the pins 33—33 were approximately centered in the guide holes 32—32 and the tubular gages 36—36 were then inserted over the pins 33—33 to accurately align the pins 33—33 in the center of the holes 32—32. The leads that were aligned in this manner were found to be well within the 0.004″ deflection from perfect axial alignment requirement.

The following is an example of an apparatus such as is shown in FIGS. 5 and 6 that will align the leads 11—11 to within the required 0.004″ deflection. The shaft 48 should be 12″ long and connected to the motor 50 with 0.040″ of eccentricity. If the stop 59 is placed so that the fulcrum 52 is midway between the ball and socket 49 and the aligning plate 46, the maximum deflection applied to the ends of the leads 11—11 is 0.040″. As the fulcrum 52 moves to the left (FIG. 5), plastic deformation of the leads 11—11 occurs when the fulcrum 52 is approximately 3″ from the stop 61 as this is the point at which the leads 11—11 are deflected 0.020″, their elastic limit. For other leads, this can be determined by experimentation. The fulcrum is moved to the left until the slide 56 strikes the stop 59 where the leads are given several rotations at 0.040″ deflection. The fulcrum 52 is then returned to its initial position at the right (FIG. 5). Although the aligning plate 46 is not perfectly vertical at this position due to the eccentricity of the shaft 48 (FIG. 5 is exaggerated), the misalignment which the instant example of an apparatus imparts to the ends of the leads may be calculated and is 0.001667″. This is well within the 0.004″ limit which was initially stated. This misalignment can be further decreased by simply increasing the length of the shaft 48.

It is to be understood that the above-described arrangements of apparatus and construction of elemental parts are simply illustrative of an application of the principles of the invention, and many other modifications may be made without departing from the invention. For example, it is within the scope of the instant invention to hold the ends of the leads in a fixed position while moving the body of the component 10 in a generally outwardly expanding involute and a generally inwardly contracting involute to align the leads.

What is claimed is:

1. A method of aligning a plurality of resilient leads fixed at one end to an article so that the leads are perpendicular to the article and in parallelism with one another, which method comprises:
- holding the article in a fixed position;
- moving the ends of the leads in a generally outwardly expanding involute to stress the leads beyond their elastic limit and deform all the leads in the same direction and magnitude until the leads are in a state of equilibrium; and then
- moving the ends of the leads in an inwardly contracting involute to return the leads to a position perpendicular to the article and in parallelism with one another so that the inherent spring back of the resilient leads does not misalign the leads.

2. A method of aligning a plurality of resilient leads fixed at one end to an article so that the leads are perpendicular to the article and in parallelism with one another, which method comprises:
- holding the article in a fixed position;
- gripping the ends of the leads to hold the leads in the desired configuration;
- moving the article and the ends of the leads relative to one another in a generally outwardly expanding involute to stress the leads beyond their elastic limit to deform all the leads in the same direction and magnitude until the leads are in a state of equilibrium; and then
- moving the article and the ends of the leads relative to one another in a generally inwardly contracting involute to return the leads to a position perpendicular to the article and in parallelism with one another so that the inherent spring back of the resilient leads does not misalign the leads on release of the gripping means.

3. Apparatus for aligning a resilient lead which extends from an article so that the lead is perpendicular to the article, which comprises:
- means for supporting the article;
- means for gripping the lead at its unsupported end and holding the lead so that its longitudinal axis is perpendicular to the article; and
- means for moving the gripping means in a generally outwardly expanding involute to stress the lead beyond its elastic limit, and for then returning the gripping means in a generally contracting involute until the lead is perpendicular to the article to overcome the inherent spring back in the resilient lead.

4. Apparatus as recited in claim 3, wherein said moving means includes:
- a shaft connected at a first end to the gripping means;
- a reciprocable fulcrum for supporting the shaft at variable points along its length;
- drive means eccentrically connected to the other end of the shaft for moving the end of the shaft in an orbit; and
- means for moving the fulcrum away from the first end of the shaft and then back so that the end of the lead moves in a generally expanding and then contracting involute manner.

5. Apparatus as recited in claim 4, wherein said fulcrum includes a spherical bearing for supporting the shaft as it is eccentrically driven by the drive means.

6. Apparatus as recited in claim 4, wherein said fulcrum has at least one opening extending therethrough, and further including:
- a restraining collar secured to the shaft, said collar having at least one roller which is received in the opening for preventing the shaft from rotating on its longitudinal axis.

7. Apparatus for aligning a plurality of resilient leads which extend in varying directions from an article so that all the leads are perpendicular to the article and in parallelism with one another, which comprises:
- means for supporting the article;
- means for gripping the leads at their unsupported ends and holding the leads so that their longitudinal axes are perpendicular to the article; and
- means for moving the gripping means in a generally outwardly expanding involute to stress all the leads beyond their elastic limit until they reach a state of equilibrium, and then returning the gripping means in a generally contracting involute until the leads are in parallelism with one another and perpendicular to the article to overcome the inherent spring back in the resilient leads.

References Cited

UNITED STATES PATENTS

| | | | |
|---|---|---|---|
| 2,609,858 | 9/1952 | Engel | 72—112 |
| 2,971,555 | 2/1961 | Paulson | 72—125 |

CHARLES W. LANHAM, *Primary Examiner.*

L. A. LARSON, *Assistant Examiner.*